United States Patent [19]

Hunter, III et al.

[11] Patent Number: 5,227,631

[45] Date of Patent: Jul. 13, 1993

[54] INFRARED DETECTOR OF THE TYPE USED IN INFRARED SPECTROMETERS

[75] Inventors: Leon J. Hunter, III, Nekoosa; Robert A. Miller, Monona, both of Wis.

[73] Assignee: Nicolet Instrument Corporation, Madison, Wis.

[21] Appl. No.: 876,964

[22] Filed: Apr. 30, 1992

[51] Int. Cl.$^5$ .......................... G01J 5/06; G01N 21/00
[52] U.S. Cl. .................................. 250/352; 250/338.1
[58] Field of Search ................ 250/352, 370.01, 338.1, 250/338.3, 370.15

[56] References Cited

U.S. PATENT DOCUMENTS

| | | | |
|---|---|---|---|
| 3,596,514 | 8/1971 | Meffero et al. | 250/352 X |
| 4,542,295 | 9/1985 | Mattson et al. | 250/352 |
| 4,555,626 | 11/1985 | Suzuki | 250/352 X |
| 5,041,727 | 8/1991 | Kojima et al. | 250/352 |
| 5,081,358 | 1/1992 | Yoshikawa | 250/338.3 |

FOREIGN PATENT DOCUMENTS

| | | | |
|---|---|---|---|
| 47-47132 | 11/1972 | Japan | 250/352 |
| 52-12880 | 1/1977 | Japan | 250/252 |

OTHER PUBLICATIONS

Specification Sheet for Temperature Stabilized Pyroelectric Detector by InfraRed Associates, Inc.

Primary Examiner—Constantine Hannaher
Assistant Examiner—Edward J. Glick
Attorney, Agent, or Firm—Foley & Lardner

[57] ABSTRACT

An infrared detector assembly for infrared spectrometers includes a circuit board on which electronic components and an infrared detector and cooler unit are mounted. The detector unit includes a thermal electric cooler which cools the detector and transfers heat to a flange of the detector unit. A front side heat sink is mounted to the flange to dissipate heat to the air on the front side of the circuit board. Heat is also transferred from the flange of the heat detector unit by a heat conductive post or posts through openings in the circuit board to a heat sink mounted to the back side of the circuit board. The back side heat sink can include an adjustment plate to which the circuit board is detachably mounted and which is itself mounted on an assembly which allows lateral adjustment of the position of the circuit board and the detector thereon. Adequate cooling of the detector is thus obtained through heat transfer to the front side and back side heat sinks, while allowing the entire circuit board and detector unit to be detached from the adjustment plate when it is necessary to replace the detector or the circuit board electronics.

11 Claims, 4 Drawing Sheets

INFRARED DETECTOR OF THE TYPE USED IN INFRARED SPECTROMETERS

FIELD OF THE INVENTION

This invention pertains generally to the field of optical systems, and particularly to infrared detectors used in devices such as infrared spectrometers.

BACKGROUND OF THE INVENTION

Infrared spectrometers, particularly Fourier transform infrared (FTIR) spectrometers, are widely used for measuring the chemical composition and characteristics of materials. In an FTIR spectrometer, infrared radiation provided by a source having a relatively broad emission bandwidth is passed through an interferometer, typically a Michelson interferometer, to modulate the beam, and then through a sample before reaching a detector. The interferometer cancels out a narrow band of the wavelengths in the beam depending on the position of a moving element within the interferometer. Canceled wavelengths are scanned across a selected portion of the bandwidth of the infrared source by the interferometer in a time varying periodic fashion. The information obtained from the detector as the interferometer modulates the beam is provided to a computer which calculates a Fourier transform on the data to determine information concerning the sample, for example, to determine an absorbance spectrum of the sample in the infrared range. This spectrum may then be utilized to identify the chemical composition of the sample.

A variety of devices using various materials have been employed to produce the infrared detectors used in FTIR spectrometers. The output signal of the detector is a time varying signal which corresponds to the time varying intensity of the infrared beam that is focused on the detector. The responsivity of virtually all infrared detectors varies as a function of the temperature of the detector itself. For certain types of detectors, such as mercury-cadmium-telluride (MCT) detectors, the detector is typically cooled down to cryogenic temperatures, e.g., by use of coolant such as liquid nitrogen, to obtain a high and stable level of sensitivity for the detector. Other types of detectors, such as DTGS detectors, are able to operate at room temperature (e.g., about 72° F.) but nonetheless have responsivity characteristics that vary significantly depending on the actual temperature of the detector itself. Where the FTIR instrument is used in a "plant" or industrial environment, the ambient temperature can vary widely, up to 40° C. Moreover, the detector itself absorbs the energy of the focused infrared beam, which tends to increase the temperature of the detector. It is possible to control the temperature of the optics enclosure within which the detector is contained, but forced air cooling can create vibrations and temperature gradients which adversely affect the other mechanisms in the optics enclosure. Thus, it is generally desirable to cool the detector itself by some means. While water cooling and the use of cryogenic liquids is feasible, such equipment adds significantly to the cost of the instrument, as well as imposing additional operating and maintenance burdens.

For spectrometers which are utilized in a production type environment, it is highly desirable that the components of the instrument be readily accessible and easily replaceable if necessary. Prior detectors have often been mounted semipermanently within the optics enclosure and replacement of such detectors generally requires the services of a skilled technician who is trained to replace and realign the detector.

SUMMARY OF THE INVENTION

The infrared detector assembly of the present invention is a compact, easily replaceable, highly reliable, and effectively self-cooled and stabilized detector of infrared radiation which can be mounted and dismounted within the optical enclosure of a spectrometer in a precisely located position without requiring specialized tools or the services of a skilled technician. The detector assembly includes an infrared sensitive detector unit having a self-contained thermal electric cooler which provides refrigerative transfer of heat from the active detector element to a heat transfer plate and flange on the exterior of the detector unit. In accordance with the present invention, heat from the detector unit is dissipated by heat sinks on both sides of the circuit board on which the detector unit is mounted. A heat sink is mounted to the heat transfer flange of the detector unit to receive heat therefrom and transfer that heat to the ambient atmosphere on the front side of the circuit board. Further, the circuit board has a main opening through which a heat conductive main post extends to make contact with the heat transfer plate at the bottom of the detector unit to transfer heat to a heat sink on the back side of the circuit board. Preferably, the detector unit is also secured to the circuit board by securing the flange of the detector unit with screws to standoffs which extend from the back side heat sink through openings in the circuit board on either side of the main opening. Thus, heat will also be conducted from the flange of the detector unit through the standoffs to the back side heat sink.

The back side heat sink may comprise an adjustment plate of metal to which the printed circuit board is mounted, and which is itself mounted to a fixture which provides for adjustment of the position of the plate and circuit board and, thereby, the infrared detector unit. In a preferred embodiment, the back side heat sink further includes a metal block from which extend the main post and the standoffs, with the adjustment plate being in contact with the heat sink block to conduct heat therefrom.

In a preferred construction for the mounting of the circuit board to the adjustment plate, fastener posts extend from the adjustment plate which are adapted to fit through corresponding holes in the circuit board near the corners of the circuit board to provide a snap fit of the circuit board onto the posts, allowing for quick mounting and dismounting of the circuit board to the adjustment plate without the need for specialized tools.

The infrared detector unit includes a self-contained thermal electric cooler which draws heat from the infrared detector element and transfers it to the flange of the detector unit and the heat transfer plate at the bottom of the detector unit (the flange and plate may be a unitary element). By monitoring the temperature of the detector unit and controlling the power supplied to the thermal electric cooler therein, heat can be removed from the detector element at a sufficiently rapid rate and transferred to the front side and back side heat sinks, where the heat can be readily dissipated, to allow the temperature of the detector element to be maintained at a desired temperature.

DETAILED DESCRIPTION OF THE INVENTION

Figure 1:
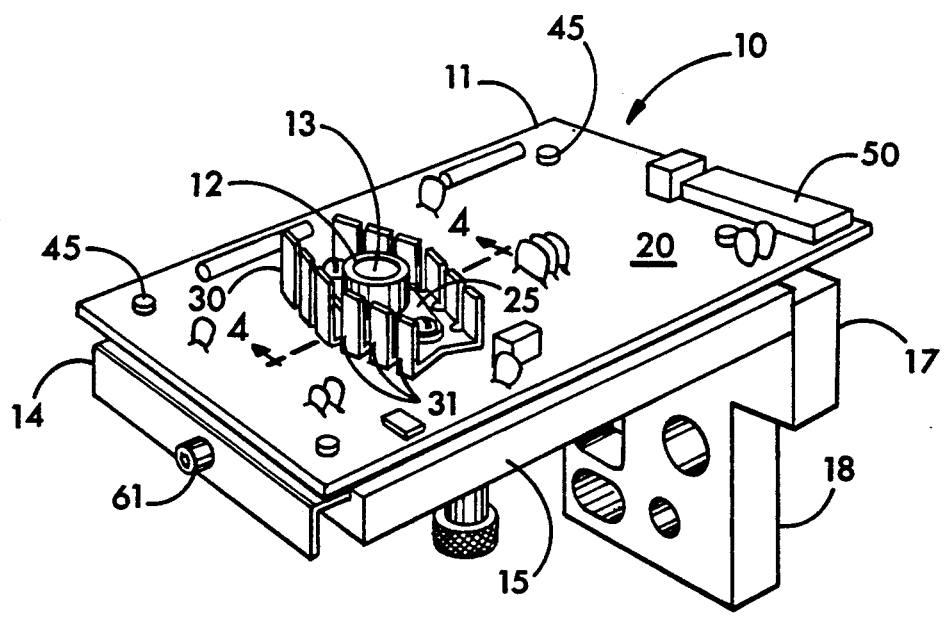
FIG. 1 is a perspective view of an infrared detector assembly in accordance with the present invention.
Figure 2:
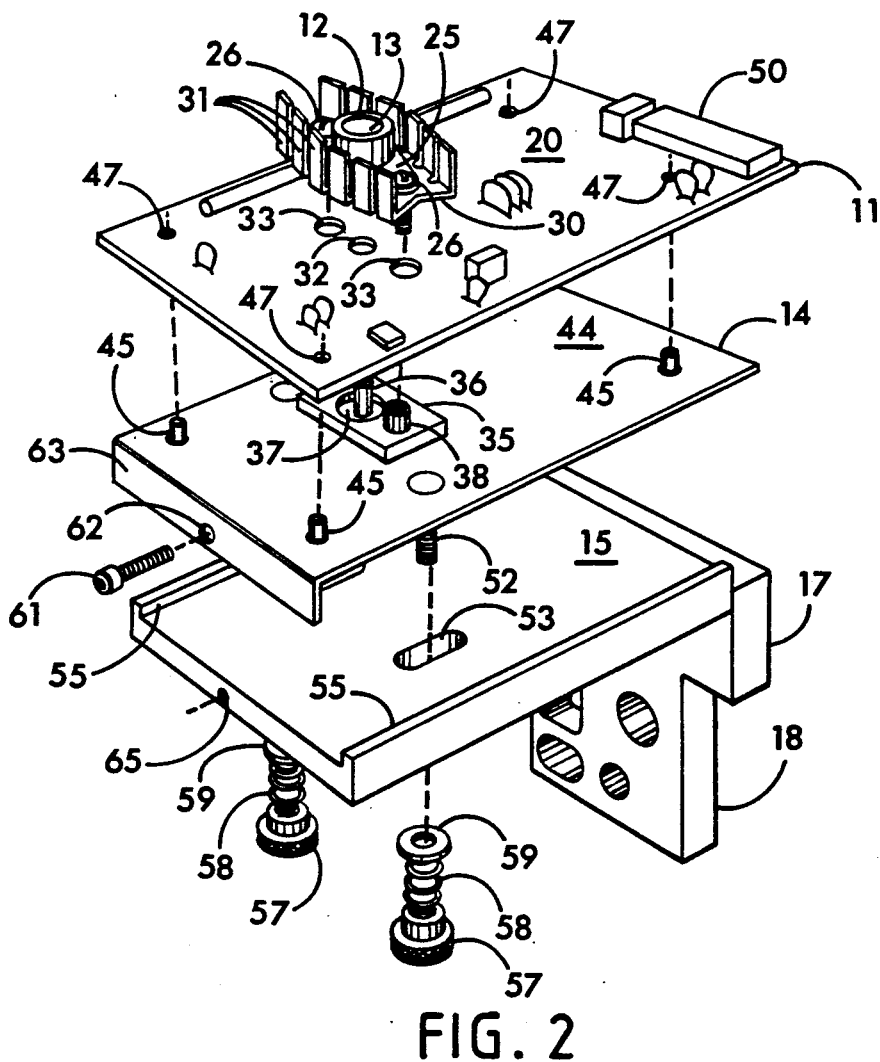
FIG. 2 is an exploded perspective view of the components of the infrared detector assembly of FIG. 1.
Figure 3:
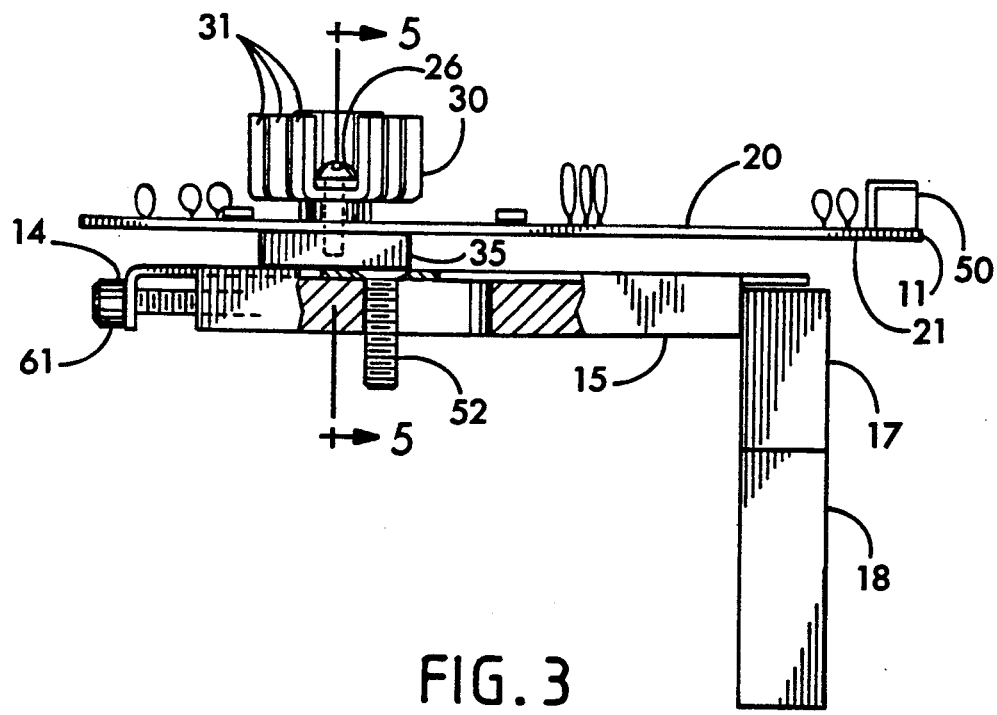
FIG. 3 is a side elevation view of the detector assembly of FIG. 1 with certain parts thereof broken away for purposes of illustration.

With reference to the drawings, an infrared detector assembly in accordance with the present invention is shown generally at 10 in a perspective view in FIG. 1 and in an exploded perspective in FIG. 2. The assembly 10 includes a printed circuit board (PC board) 11 on which are mounted various electronic components associated with the detector, as well as an infrared detector unit 12 having an infrared transmissive window 13 beneath which is mounted the active infrared detector element (not shown). The circuit board 11 is detachably mounted to an adjustment plate 14 which is itself mounted for sliding movement to a slide plate 15 of mounting fixture 17 which has a baseplate 18 by which the fixture is mounted to a base or chassis enclosure of an infrared spectrometer (not shown).

Figure 6:
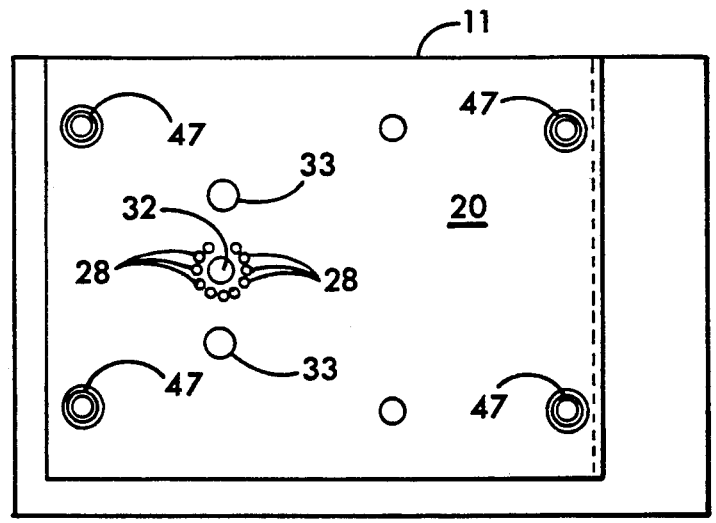
FIG. 6 is a top plan view of the circuit board component of the infrared detector assembly with the parts otherwise mounted thereon removed.
Figure 7:
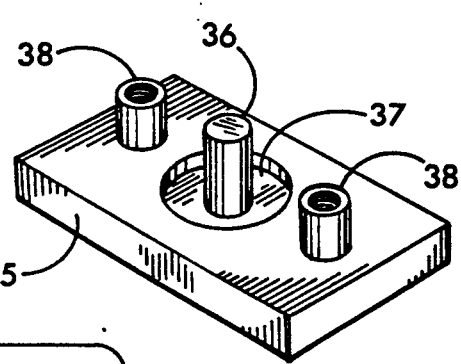
FIG. 7 is a perspective view of the back side heat sink block which forms part of the assembly of FIG. 1.

The PC board 11 has a front side 20 to which the various electrical components are mounted, and a back side 21. The detector unit 12 is mounted, with the other circuit components, to the front side 20. The detector 12 is preferably a unitary detector and thermal electric cooler incorporated in a single enclosure (e.g., a TO-66 package), and has an outer case with a flange 24 with tabs 25 extending from two sides thereof to allow the detector unit to be mounted using screws 26 which pass through holes in the tabs. As noted below, the flange 24 may act as the heat transfer plate for the thermal electric cooler. The detector/cooler unit 12 also has a plurality of lead wires 27 (not shown in FIGS. 1 and 2) extending downwardly therefrom which are adapted to fit into an appropriate socket, such as shown at 28 in FIG. 6.

Appropriate infrared detector and thermal electric cooler units are commercially available. An example is a temperature stabilized pyroelectric detector available in a TO-66 package from Graseby Infrared, Orlando, Florida, Model SP-24-N. Such units include a self-contained detector element, a thermal electric cooler, and a thermistor, the latter allowing the temperature of the detector to be monitored so that the electric power applied to the thermal electric cooler can be controlled. The heat drawn by the thermal electric cooler from the detector element is transferred to the metal flange 24 of the detector unit which includes a bottom plate surface which is surrounded by the lead wires or pins. To allow the thermal electric cooler to adequately cool the detector element and maintain a desired temperature at the element, it is necessary that heat be drawn away from the heat transfer flange 24 of the detector.

In the present invention, adequate heat transfer away from the detector/cooler unit 12 is obtained by utilizing heat sinks o both the front and back sides of the circuit board 11. As illustrated in the figures, on the front side of the circuit board a conventional thin metal heat sink 30, having upright vanes 31 separated from one another to maximize dissipation of heat to the ambient air, is mounted beneath the flange 24 of the detector and in close contact therewith so as to conduct heat away from the flange. Preferably, the heat sink 30 is mounted at a position spaced above the circuit board 20 s that all sides of the heat sink can make contact with the ambient air and allow heat to be removed from the heat sink by the air.

Generally, because of the significant amount of heat that must be removed from the detector, the single heat sink 30 at the front side 20 of the circuit board will not be sufficient to adequately dissipate the heat, particularly where the ambient temperature is relatively high. In the present invention, heat dissipation from the front side of the circuit board is augmented by heat dissipation on the back side of the circuit board. To allow heat conduction from the detector unit 12 through the circuit board to the back side, a main opening 32 and two side openings 33 ar provided in the circuit board. A heat sink block 35 is positioned on the back side 21 of the circuit board 11 and has a central heat transfer post 36 extending upwardly therefrom from an indented well 37, and two additional upright standoff posts 38 on opposite sides of the post 36. The central post 36 is adapted and sized to pass through the main opening 32 whereas the standoffs 38 pass through the side openings 33. Each of the standoff posts 38 has a central threaded bore therein which is adapted to threadingly receive the screws 26 which mount the detector 12. The block 35, center post 36, and standoff posts 38 are all formed of a good heat conducting metal, such as aluminum, copper, or various alloys.

Figure 4:
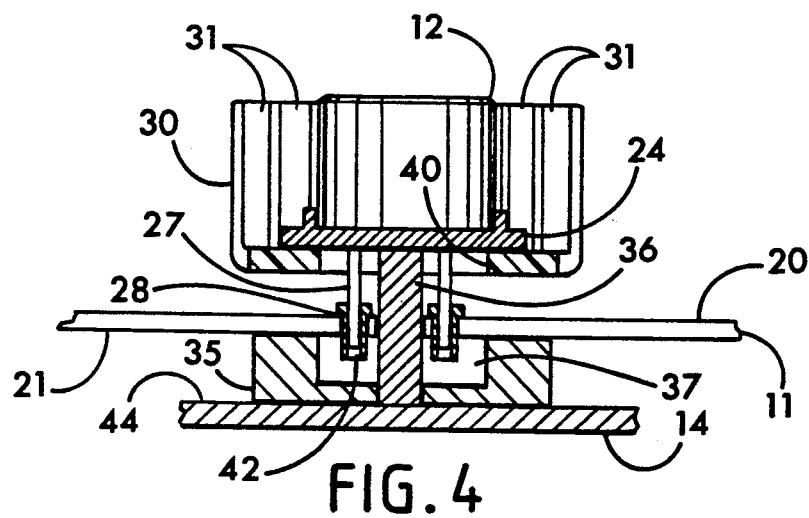
FIG. 4 is a partial cross-sectional view through the infrared detector unit and adjacent portions of the heat sinks and circuit board, taken generally along the line 4—4 of FIG. 1.
Figure 5:
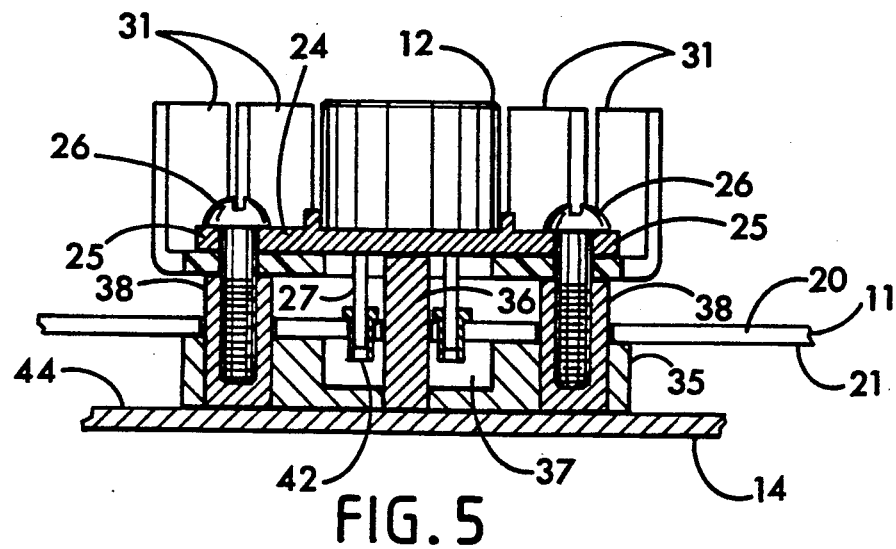
FIG. 5 is a cross-sectional view of the infrared detector unit, the circuit board, and the adjacent heat sinks, taken generally along the line 5—5 of FIG. 3.

During assembly of the detector unit 12 to the circuit board 11, the standoffs 38 and the center post 37 are passed through the holes 33 and 32, respectively, so that they extend above the front side 20 of the circuit board. The lead wires 27 of the detector 12 are then passed through the center opening 40 of the heat sink 30 and into corresponding holes in the socket 28. The screws 26 are then passed through the tabs 25 on the flange and through corresponding holes in the heat sink 30, and the screws are then threaded into the bores of the standoffs 38 and tightened down to produce a fully assembled structure as shown in FIGS. 4 and 5. As illustrated therein, the well 37 allows the heat sink block 35 to be brought up tight against the back side 21 of the circuit board, and the top of the post 36 to tightly engage the bottom of the heat transfer flange 24 of the detector unit, without interference from the socket extensions 42 which extend below the back side 21 of the circuit board. As best illustrated in the cross-sectional view of FIG. 5, the mounting of the heat sink block 35 to the infrared detector 12 in the manner described above provides heat flow paths from the detector to the block 35 as follows: through the flange 24 to the screws 26 to each of the standoff posts 38 and thence to the block 35, and also from the flange 24 through the center post 36 to the block 35. The block 35 is preferably formed of a metal having a high thermal conductivity (e.g., aluminum), and also provides a thermal mass to absorb some of the heat being transferred from the detector. The heat sink block 35 can itself be cooled by air in contact with its surfaces. To further increase the efficiency of the heat transfer, the flat bottom surface of the heat transfer block 35 is in tight contact with the flat upper surface 44 of the adjustment plate 14, resulting in transfer of heat from the block 35 to the relatively large and thin metal plate 14. The plate 14 is preferably formed of a relatively thin but rigid sheet metal material, preferably having a high thermal conductivity (e.g., aluminum), and rapidly conducts heat away from the areas of transfer of heat from the block 35 to the plate. Because of the large surface area of the plate 14 in contact with the ambient atmosphere, the plate 14 is an efficient dissipator of heat to the ambient air.

Once the screws 26 are tightly threaded to the standoffs 38, the detector 12 and heat sink 30 are held firmly in place above the circuit board. Because the adjustment plate 44 firmly presses the heat sink block 35 against the back side 21 of the circuit board 11, the detector 12 and the heat sink 30 are held firmly spaced above the circuit board 11. However, if it is desired to remove the detector unit 12 to replace it, this can simply be done by unscrewing the screws 26, requiring no more complicated equipment than a standard screwdriver. A similar detector unit can then be remounted in the exact same position as the original detector by using the screws 26.

Figure 8:
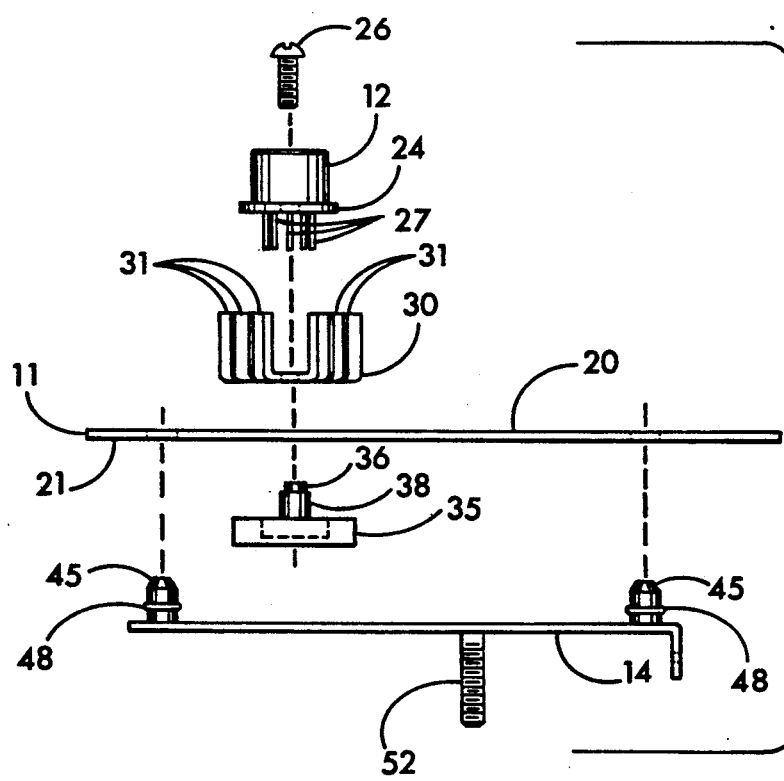
FIG. 8 is another exploded view, taken from the side, of the heat detector assembly of FIG. 1.

As indicated above, the circuit board 11 is preferably detachably mounted to the adjustment plate 14 in a manner which firmly holds the circuit board to the plate and also firmly presses the plate 14 against the heat sink block 35. While various means are available for detachably mounting the circuit board to the plate, a preferred structure is best illustrated in the exploded views of FIGS. 2 and 8. As illustrated therein, the adjustment plate 14 has several fastener posts 45 mounted thereto which extend upwardly from the top surface 44 of the plate. Each of the fastener posts 45 is formed of a split structure which can be compressed inwardly. These fastener posts are sized to fit into holes 47 in the circuit board, preferably at positions near the corners of the circuit board. When the fastener posts 45 are fitted into the holes 47, they are compressed inwardly to pass through the hole and hold tight to the walls of the hole when the board is fully pressed onto the fastener and the bottom of the board is in contact with a detent ring 48 on each of the fasteners, thereby firmly holding the circuit board at a spaced position away from the plate 14. The spacing of the circuit board 11 from the plate 14 is selected to provide tight engagement of the plate 14 to the heat sink block 35 which is thus pressed against the back side of the PC board while providing an air space to allow dissipation of heat from the plate 14. Conversely, when an operator wishes to remove the circuit board, with or without the detector 12 mounted thereon, removal is simply accomplished by pulling the circuit board 11 off of the fasteners 45, which can be aided with slight pressure from a screwdriver inserted between the circuit board and the plate at the fasteners. The electrical connections between the circuit board 11 and the remaining electrical components of the spectrometer (not shown) are accomplished using a standard multi-pin connector, illustratively indicated by the block 50, thereby allowing easy and complete replacement of the entire circuit board and detector unit without the need for special tools or any trained personnel. In this manner, a damaged or malfunctioning circuit board or detector can easily be replaced in the field by the user with minimal down time of the spectrometer.

The adjustment plate 14 is itself mounted to the slide plate 15 for sliding lateral movement. The slide plate 15 is also preferably formed of a good heat conductive metal, such as aluminum, and it conducts heat away from the adjustment plate where the two plates are in contact. The adjustment plate 14 has a pair of threaded studs 52 fixed thereto which pass through slots 53 in the slide plate 15. The walls of the slot 53 which are in engagement with the studs 52, and side walls 55 rising up from the slide plate 15 which engage the side edges of the adjustment plate 14, constrain the adjustment plate 14 so that it cannot move in a direction perpendicular to the slots 53. Threaded bolts 57 are engaged to the threaded studs 52 with a spring 58 and washer 59 between the bolts 57 and the backside of the slide plate 15. Thus, when the bolts 57 are engaged to the studs 52, the springs 58 pull the studs 52 through the slots 53 and thus pull the adjustment plate 14 against the face of the slide plate 15. Nonetheless, the adjustment plate 14 can slide laterally as the studs 52 move back and forth in the slots 53 to the limits of the slots. To set the position of the adjustment plate 14 with respect to the slide plate 15, a threaded adjustment screw 61 is passed through an opening 62 in a flange 63 extending downwardly from the remainder of the adjustment plate 14, with the screw 61 being engaged to a threaded hole 65 in the end of the slide plate 15. Thus, the precise position of the detector 12 can be determined by adjusting the screw 61 until the detector is in the proper position and then tightening down the screws 57 so that very firm pressure is applied by the washers 59 against the back of the slide plate 15 so that the adjustment plate 14, and the PC board and detector unit attached to it, are held firmly in place.

Figure 9:
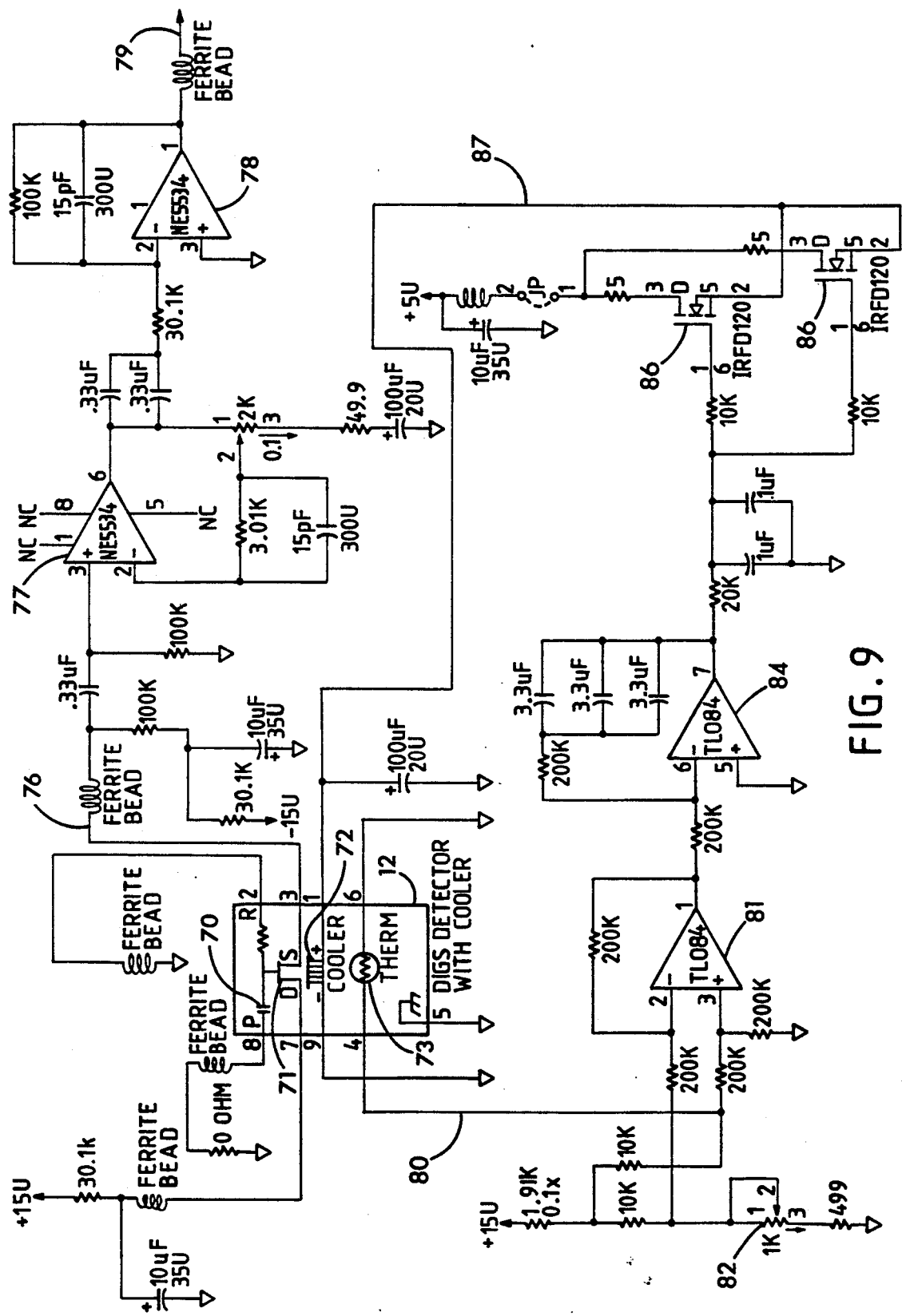
FIG. 9 is a schematic circuit diagram of the infrared detector unit and the driver circuit for the thermal electric cooler.

A simplified schematic circuit diagram of the electrical drive circuit for the detector unit is shown in FIG. 9. Within the detector unit 12 is the detector element 70 itself. The signal from the element 70 is provided to the gate of an FET 71 within the package of the detector unit 12. Also within the detector package is a thermal electric cooler 72 and a thermistor 73. The output signal from the FET 71 is provided on a line 76 to an amplifier 77 and then through coupling components to another amplifier 78 to provide an amplified output signal on a line 79 in a conventional fashion.

The output signal from the thermistor 73 is provided on an output line 80 to the input of an amplifier 81. The amplifier 81 forms part of a comparison circuit which includes a variable resistor 82 to allow adjustment of the temperature set point of the thermal electric cooler. The output of the amplifier 81 is provided to another amplifier 84 and then to a driver circuit which includes two power FETs 86 connected in parallel to supply output power on a line 87 to the cooler 72. In this manner, the cooler 72 is supplied with power to draw away heat from the detector whenever the thermistor signal on the line 80 is greater than the corresponding temperature set point as determined by the adjustable resistor 82.

It is understood that the invention is not limited to the particular construction and embodiments set forth herein as illustrative, but embraces such modified forms thereof as come within the scope of the following claims.

What is claimed is:

1. An infrared detector assembly for infrared spectrometers, comprising:
    (a) a circuit board with a front side and a back side, and at least one opening extending from the front side to the back side;
    (b) a thermal electric cooled infrared detector unit having a window through which infrared radiation is received for detection and a flange for heat exchange;
    (c) a front side heat sink mounted in i contact with the flange of the infrared detector unit to conduct heat therefrom and dissipate heat in the ambient air on the front side of the circuit board;
    (d) a back side heat sink mounted on the back side of the circuit board and having at least one heat conductive post extending from the back side heat sink up through the opening in the circuit board and into heat transfer contact with the flange of the detector unit to draw heat therefrom through the post to the heat sink; and
    (e) means for connecting the detector unit, the front side heat sink and the back side heat sink to the circuit board and to each other.

2. The infrared detector assembly of claim 1 wherein the at least one post is a central post and the means for connecting the detector unit and front side and back side heat sinks includes heat conductive standoff posts extending upwardly from the back side heat sink on either side of the central post through side openings formed in the circuit board on either side of the one opening, and screws through the flange extending into and threaded into threaded bores int he standoff posts to hold the flange against the front side heat sink and to hold the front side heat sink against the standoff posts.

3. The infrared detector assembly of claim 2 wherein the back side heat sink includes a block of heat conductive metal and wherein the central post and the standoff posts extend from the block.

4. The infrared detector assembly of claim 3 wherein the back side heat sink further includes an adjustment plate formed of a heat conductive metal and mounting means for detachably mounting the circuit board to the adjustment plate such that the adjustment plate presses against the heat sink block and presses the block against the back side of the circuit board such that a heat conductive path is formed from the heat sink block to the adjustment plate.

5. The infrared detector assembly of claim 4 further including a mounting fixture having a slide plate and a baseplate joined therewith, the slide plate adapted to have the adjustment plate slide thereon, and means for connecting the slide plate to the adjustment plate to allow adjustable movement of the adjustment plate with respect to the slide plate to locate the adjustment plate and the circuit board mounted thereto in a desired position.

6. The infrared detector assembly of claim 4 including a plurality of holes formed in the circuit board near the corners of the circuit board and wherein the mounting means includes fastener posts extending up from the adjustment plate and shaped and sized to fit in the holes near the corners of the circuit board to provide a snap fit of the circuit board onto the fastener posts to allow ready attaching and detaching of the circuit board to the posts at a desired spacing of the circuit board back side from the adjustment plate.

7. The infrared detector assembly of claim 4 wherein the front side heat sink has metal fins which extend upwardly at positions around the infrared detector unit which are adapted to dissipate heat into the ambient air.

8. The infrared detector assembly of claim 1 wherein the back side heat sink includes an adjustment plate formed of a heat conductive metal, mounting means for detachably mounting the circuit board to the adjustment plate such that the adjustment plate is spaced from the back side of the circuit board, a heat conductive path being formed from the flange of the detector unit through the post to the adjustment plate.

9. The infrared detector assembly of claim 8 further including a mounting fixture having a slide plate and a baseplate joined therewith, the slide plate adapted to have the adjustment plate slide thereon, and means for connecting the slide plate to the adjustment plate to allow adjustable movement of the adjustment plate with respect to the slide plate to locate the adjustment plate and the circuit board mounted thereto in a desired position.

10. The infrared detector assembly of claim 8 including a plurality of holes formed in the circuit board near the corners of the circuit board and wherein the mounting means includes fastener posts extending up from the adjustment plate and shaped and sized to fit in the holes near the corners of the circuit board to provide a snap fit of the circuit board onto the fastener posts to allow ready attaching and detaching of the circuit board to the posts at a desired spacing of the circuit board back side from the adjustment plate.

11. The infrared detector assembly of claim 8 wherein the back side heat sink further comprises a heat sink block of conductive metal from which the post extends, the heat sink block being in heat transfer contact with the adjustment plate.

* * * * *

UNITED STATES PATENT AND TRADEMARK OFFICE
CERTIFICATE OF CORRECTION

PATENT NO. : 5,227,631

DATED : July 13, 1993

INVENTOR(S) : Leon J. Hunter, III; Robert A. Miller

It is certified that error appears in the above-identified patent and that said Letters Patent is hereby corrected as shown below:

Column 4, line 25, "s that" should be --so that--.

Column 4, line 39, "ar" should be --are--.

Column 7, line 21, "in i contact" should be --in contact--.

Column 7, line 44, "int he" should be --in the--.

Signed and Sealed this

Fifteenth Day of March, 1994

*Attest:*

BRUCE LEHMAN

*Attesting Officer*    *Commissioner of Patents and Trademarks*